United States Patent [19]  [11] 3,774,206
Rauch  [45] Nov. 20, 1973

[54] PSEUDO-RANDOMLY PHASE MODULATED RADAR ALTIMETER

[75] Inventor: Sol Rauch, Montreal, Quebec, Canada

[73] Assignee: Canadian Marconi Company, Montreal, Quebec, Canada

[22] Filed: Aug. 16, 1971

[21] Appl. No.: 172,071

[30] Foreign Application Priority Data
Sept. 8, 1970  Canada ................................ 092577

[52] U.S. Cl. .......... 343/7 A, 343/12 A, 343/17.2 R, 343/17.7
[51] Int. Cl. ............................................. G01s 9/23
[58] Field of Search ............. 343/7 A, 12 A, 17.1 R, 343/17.2 R, 17.2 PC, 17.7

[56] References Cited
UNITED STATES PATENTS

| | | | |
|---|---|---|---|
| 3,208,065 | 9/1965 | Gutleber et al. ............... | 343/17.1 R |
| 3,217,324 | 11/1965 | Adamsbaum et al. .... | 343/17.2 PC X |
| 3,341,849 | 9/1967 | Cordry et al. ................... | 343/17.7 X |
| 3,510,595 | 5/1970 | Gutleber ..................... | 343/17.1 R X |
| 3,663,935 | 5/1972 | MacMullen .............. | 343/17.2 PC X |

*Primary Examiner*—T. H. Tubbesing
*Attorney*—Melvin Sher

[57] ABSTRACT

This invention relates to a pseudo-randomly phase modulated radar altimeter wherein the phase of a CW wave is shifted between 0° and 180° in a pseudo-random fashion by a modulation code generator prior to transmission, and a reflected wave is demodulated in the same way by a tracking code generator which provides a code identical to the modulation code generator code. A feature of the invention is that, in order to provide a self-test facility a digitally simulated delay is provided. The performance monitoring facility takes cognizance of the fact that, when the receiver is tracking, a closed loop is formed and that, in a closed loop, a perturbation introduced at one point will travel all around the loop. In the system, a perturbation is introduced at one point in the loop and a second point in the loop is examined for the presence or absence of the perturbation. The relative delay between the modulation code generator and the tracking code generator is indicative of the travel time of a reflected wave. In order to translate this data to useful information, a pulse is provided from the generators to different inputs of a flip-flop when the generators pass all ones state (or any other preselected state). The output of the flip-flop is then a train of pulses whose duty cycle is proportional to the relative delay between generators. Acquisition is effected by providing zero relative delay between the generators at the start. The tracking code generator is then automatically delayed by one clock pulse periodically. The automatic delay is terminated when the relative delay between the generators is equal to the two-way travelling time of a reflected signal, i.e. the system begins to track.

13 Claims, 4 Drawing Figures

PSEUDO-RANDOMLY PHASE MODULATED RADAR ALTIMETER

This invention relates to a pseudo-randomly phase modulated radar altimeter. More specifically, this invention relates to a pseudo-randomly phase modulated radar altimeter containing novel approaches to self-testing, performance monitoring, output conversion and automatic acquisition.

In the inventive system, a CW wave is phase modulated at predetermined intervals by reversing the phase 180° before transmission. The modulating signal comprises a pseudo-random sequence of pulses, and the leading edge of a pulse causes the phase of the CW wave to be reversed by 180° while the trailing edge of the pulse causes it to be reversed by a further 180° returning the CW wave to its original phase prior to the action of the leading edge of the pulse.

The thus modulated wave is then transmitted, and a reflected signal is demodulated in the same manner as the transmitted wave is modulated. The delay between transmitted and received waves is then measured as will be explained below, to determine the distance that the wave has travelled. In an aircraft radar altimeter, the height of the aircraft is, of course, equal to half the distance that the wave has travelled.

The advantages and disadvantages of pulse and FM/CW radar altimeter systems are well known in the art. The phase modulated CW system of the instant invention retains substantially all the advantages of both systems while eliminating substantially all of the disadvantages of both systems.

The pseudo-random sequence may be produced by a linear maximal length shift generator as described, for example, in an article by Scholefield titled Shift Registers at page 389 et seq. of Electron Technology, Oct. 1960, or in an article by Ward titled Acquisition of Pseudonoise Signals by Sequential Estimation at page 475 et seq of IEEE Transactions on Communication Technology, Vol. COM-13, No. 4 Dec. 1965. The code produced by such a register, when the feedback taps are properly chosen, has a number of unique characteristics. First, the code will be of length $N=2^n-1$, where n is the number of stages in the register and N is the number of pulses and spaces in a cycle. This represents the longest possible code which can be generated by an n stage register. Second, the difference between the number of positive and negative elements of the code (pulses and spaces) is always one. Third, when the code is multiplied by itself delayed, (delay must be equal to an integer number of elements) the product code is the original code with a new delay. It is these last two features which give the code its desirable autocorrelation function (See, for example, DRTE Report No. 1031 by Davies, N.G., titled Some Properties of Linear Recursive Sequences, dated Dec., 1959, at page 6.

For continuously tracking the delay difference between two correlated waveforms, the delay-lock discriminator is a statistically optimum device. The discriminator is a non-linear feedback system which employs a form of cross-correlation in the feedback loop. The following constitutes a partial list of references available describing the delay-lock discriminator; IEE Transactions on Space Electronics and Telemetry, Mar., 1963, page 1 et seq., Delay-Lock Tracking of Binary Signals, Spilker; Proceedings of the IRE, Sept. 1961, page 1402 et seq, The Delay-Lock Discriminator-An optimum Tracking Device, Spilker; IRE Transctions on Space Electronics and Telemetry, Mar. 1962, page 1 et seq., Tracking Systems Employing the Delay-Lock Discriminator, O'Sullivan; and, IEE Transactions on Aerospace and Electronic Systems, July 1966, page 415 et seq., A Comparison of Binary Delay-Lock Tracking-Loop Implementations, Gill.

As can be seen in these references, the delay-lock discriminator provides continuous measurement of delay by cross-correlation of one signal (e.g., a signal reflected from a target that is to be tracked) with a locally generated reference signal. Typical tracking applications of the delay-lock discriminator are described in the above-mentioned references.

In operation, an input signal to the delay-lock discriminator is multiplied by each of two time displaced pseudo-noise signals, generated by a linear maximal shift register and obtained from two different taps thereof, identical in form to the input pseudo-noise signal. The difference of the multiplier outputs is filtered in a low pass filter and the voltage so obtained is used to control the frequency of a variable frequency oscillator. The oscillator serves as a clock for the register.

The average output of each multiplier is a function of the phase, or delay, error between the input and the reference sequences to the multiplier. These functions are simply time-displaced autocorrelation functions of the pseudo-noise signal. Since the filter is low pass, it tends to obtain the average of the differenced multiplier outputs. When the loop is closed and the reference signal is somehow brought into synchronism with the input signal, the loop will lock on and track.

The use of maximal length linear feedback shift register sequences is particularly advantageous in this application for the following reasons: It is easy to regenerate this type of signal in the discriminator with any desired amount of delay. Further, maximal length sequences have two level autocorrelation functions, i.e., within the period of the sequence, only one correlation peak occurs, thus allowing unambiguous delay determination up to a maximum propagation delay equal to the period of the sequence.

The invention will be better understood by an examination of the following description together with the accompanying drawings in which FIG. 1 illustrates a highly simplified block diagram of the system suited to the purpose of presenting the fundamentals of the operation thereof;

Figure 1:
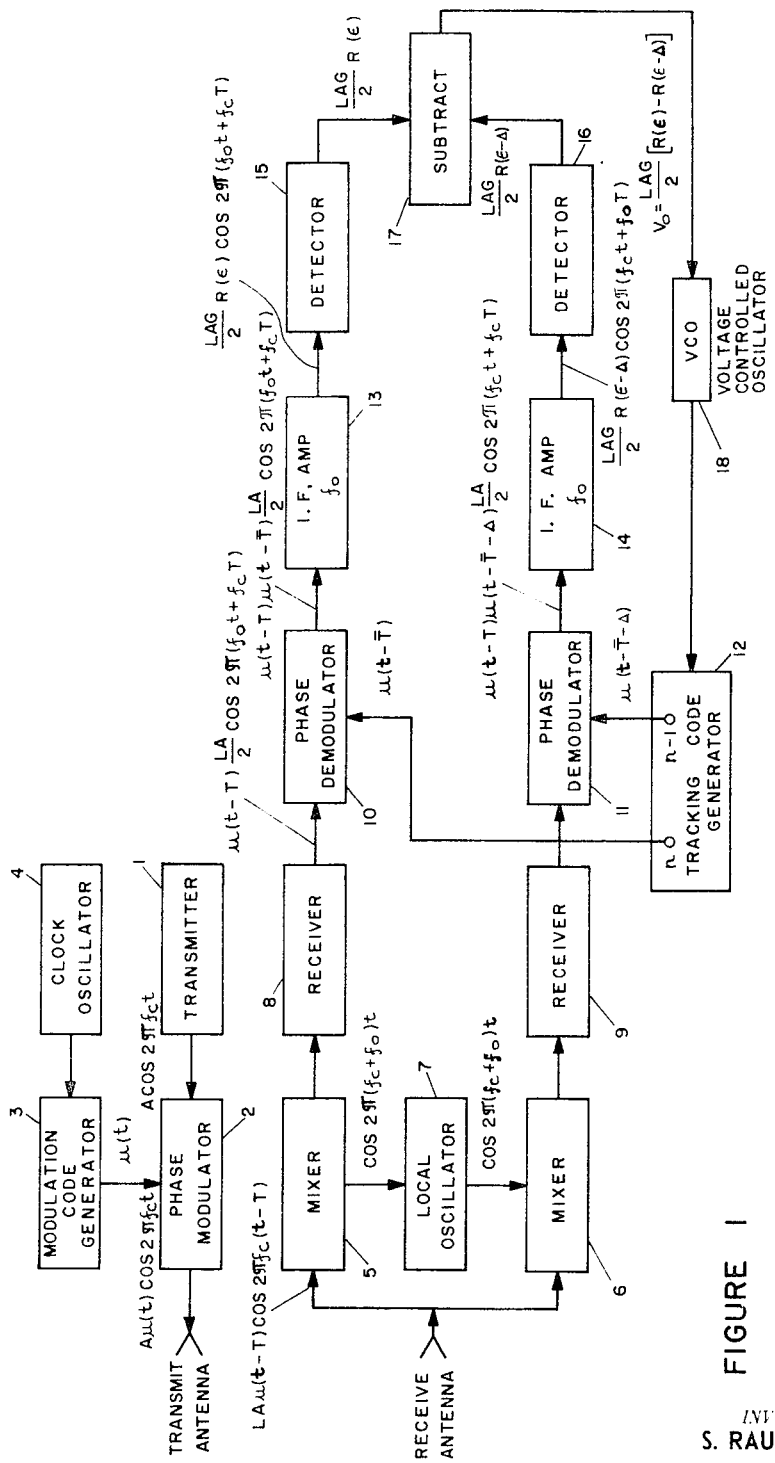

Referring to FIG. 1, the transmitter 1 generates a signal which can be mathematically described as $$e_o(t) = A\cos 2\pi f_c t \qquad (1)$$

where $f_c$ is the transmitter frequency in Hz and $A$ is the peak amplitude of the output.

The R.F. phase modulator 2, which is driven by the modulation code generator 3 (a maximal length linear feedback shift register) which is in turn controlled by clock oscillator 4, reverses the phase of the transmitted output co-incident with the changes between code levels. The phase of the carrier is switched between 0° and 180°. If u(t) is a pseudo-random sequence with levels −1 and +1, then the output of the phase modulator is $$e_1(t) = Au(t) \cos 2\pi f_c t \qquad (2)$$

This signal is transmitted to the ground and part of the energy is reflected back to the receive antenna.

The received signal is given by $$e_2(t) = ALu(t) \cos 2\pi f_c(t-T) \qquad (3)$$

where $T$ is the two way propagation time, and $L$ is the propagation loss.

The received signal is mixed in parallel mixers 5 and 6 with the output of a local oscillator 7 which is offset from the carrier frequency by $f_o$ Hz. The local oscillator signal is represented by the expression:

$$e_a = \cos 2\pi(f_c + f_o)t \qquad (4)$$

With the higher frequency components of the receiver output being filtered off, the outputs of parallel receivers 8 and 9 are identically $$e_{o1} = LA/2 \, u(t-T) \cos 2\pi(f_o t + f_c t) \qquad (5)$$

The parallel phase demodulators 10 and 11 multiply the received signal with each of two adjacent outputs of the reference tracking code generator 12, which is adapted to generate a code identical to the code generated by the modulation code generator 3. If $\bar{T}$ is the delay estimate of $T$ and $\Delta$ is the width of a code digit, and in this case the relative delay between the two outputs of the tracking code generator, the outputs of the phase demodulators 10 and 11 are given respectively by $$e_{u2} = LA/2 \, u(t-\bar{T}) \, u(t-T) \cos 2\pi \, (f_o t + f_c T) \qquad (6)$$

$$e_{L2} = LA/2 \, u(t-\bar{T}-\Delta) \, u(t-T) \cos 2\pi(f_o t + f_c T) \qquad (7)$$

The I.F. amplifiers, 13 and 14, which follow are tuned to the frequency $f_o$. Consequently, the D.C. component of $u(t-\bar{T}) \cdot u(t-T)$ and $u(t-\bar{T}-\Delta) \cdot u(t-T)$ are filtered off in the respective amplifiers. Thus the outputs of the I.F. amplifiers 13 and 14 are respectively $$e_{u3} = LAG/2 \, R(\epsilon) \cos 2\pi(f_o t + f_c T) \qquad (8)$$

$$e_{L3} = LAG/2 \, R(\epsilon-\Delta) \cos 2\pi(f_o t + f_c T) \qquad (9)$$

where
$R(\epsilon)$ is the autocorrelation function of $u(t)u(t+\epsilon)$
$R(\epsilon-\Delta)$ is the autocorrelation function of $$u(t)u(t+\epsilon -\Delta)$$

$\epsilon = \bar{T}-T$ is the error in the delay estimate and
$G$ is the amplifier gain The outputs of detectors 15 and 16 are given respectively by $$e_{u4} = GLA/2 \, R(\epsilon) \qquad (10)$$

$$e_{L4} = GLA/2 \, R(\epsilon-\Delta) \qquad (11)$$

The outputs of the detectors are applied to the input terminals of subtractor 17 whose output drives the voltage controlled oscillator 18. Therefore, the error voltage driving the VCO is $$V_o = GLA/2 \, [R(\epsilon) - R(\epsilon-\Delta)] \qquad (12)$$

This voltage drives the oscillator until $\epsilon=\Delta/2$, i.e., $\bar{T} = T+\epsilon/2$. This occurs when $V_o=0$. Therefore, under tracking conditions, by measuring the time displacement between the output of the modulation code generator and the tracking code generator, the two way propagation time is determined to within the constant $\Delta/2$.

Figure 2:
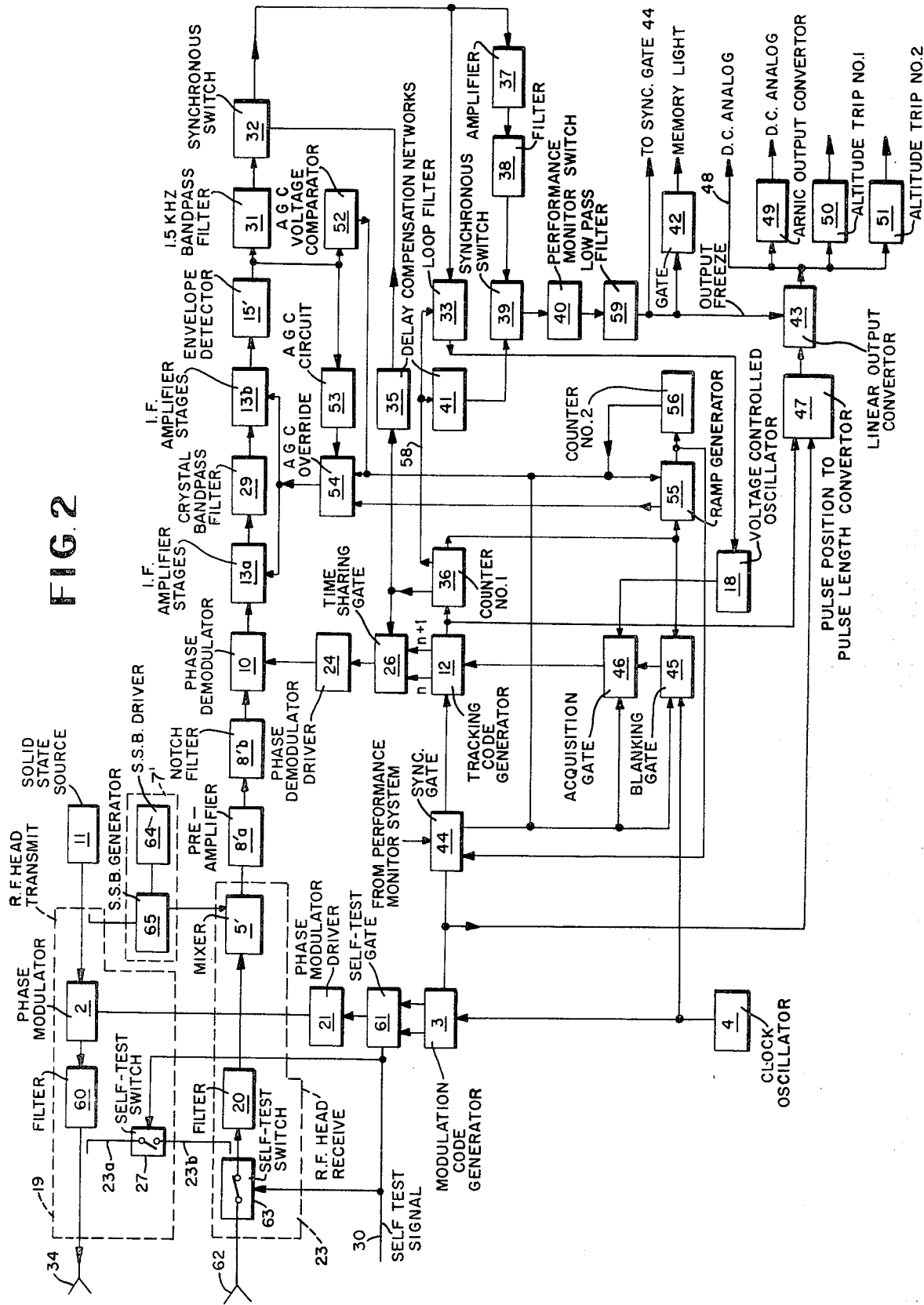
FIG. 2 illustrates a preferred embodiment of the invention.

A preferred embodiment of the invention is illustrated in FIG. 2. Referring to FIG. 2, all components which operate at the RF frequency (in the preferred embodiment — 4.3 GHz) are enclosed in the dotted lines 19, 7' and 23. These components comprise the RF head. The transmitter portion consists of a solid state source 1', a phase modulator 2, filter 60 and antenna 34. The phase modulator is driven by phase modulator driver 2' which receives a coded signal from modulation code generator (maximal length linear feedback shift register) 3 through the self-test gate 61. The clock pulse input to the modulation code generator is supplied by clock oscillator 4.

The self-test facility is provided by self-test switch 27 and schematically represented waveguide sections 23 and 23 which couple the output of the transmitter with the input of the receiver, as well as self-test switch 63 and the previously mentioned self-test gate 61. A self-test signal is provided on line 30 to drive the switches 27 and 63 and gate 61.

The offset frequency is provided by SSB driver 64 and SSB generator 65. The input of the SSB generator is coupled to the solid state source, and the output of the generator feeds mixer 5'.

A reflected signal is received by antenna 62 and fed to the mixer 5' through self-test switch 63 and filter 20. The output of the mixer is fed to the preamplifier 8'a which is tuned to the receiver IF, and the output of the preamplifier is connected to a notch filter 8'b which suppresses the 30 MHz coming from the SSB.

The phase demodulator 10, which has the same function as the modulator, i.e., to change the phase of the received signal by 180° at predetermined times, may comprise a balanced ring modulator which uses Schotky barrier diodes. It receives the output of the notch filter and is driven by phase demodulator driver 24 which brings the output of the tracking code generator 12 to the level required to drive the demodulator. The tracking code generator is connected to the driver through a time sharing gate 26. The time sharing gate alternately passes the signal from one of the nth or (n+1)th flip-flops of the register comprising the tracking code generator at a predetermined rate — in the preferred embodiment, 1.5 KHz.

The output of the phase demodulator is fed to the I.F. amplifier system which consists of several stages of relatively wideband gain at 30 MHz 13a and 13b, a crystal bandpass filter 29 and an envelope detector 15'. The output of the I.F. amplifier system is, in turn, fed to the 1.5 KHz bandpass filter 31, to synchronous switch 32, to loop filter 33 and to the voltage controlled oscillator 18. The envelope detector, bandpass filter and synchronous switch constitute the subtraction means, and the loop filter constitutes the feedback loop, of the delay lock discriminator. However, instead of comparing the outputs of two physical parallel channels, the output of one physical channel is time shared to produce two time channels which are compared to provide the driving signal for the voltage controlled oscillator. As in the delay lock discriminator, the voltage controlled oscillator provides the clock pulses for the tracking code generator when the system is tracking, but, in contradistinction thereto, it does not provide such pulse during acquisition as will be explained below. Delay compensation network 35, fed from counter 36, adjusts the counter output for the relative delay of the 1.5 KHz reference signal of the synchronous switch 32. This is to make up for the delay suffered by the signal in passing through the IF amplifier.

The counter 36 is utilized as a frequency divider and may consist of a series of flip-flops wherein the 1 output of a stage is connected to the clock input of the following stage. It is referred to as a counter in that it counts pulses at the input and provides a pulse at the output for every nth pulse at the input.

In the preferred embodiment, pulses at a rate of 1.5 KHz and 47 Hz are required and MHz/2047 provided by the counter 36 as follows: The tracking code generator is an eleven stage maximal length shift register consisting of eleven high speed J-K flip-flops producing a code of 2047 pulses in length. An AND gate monitors the $\overline{Q}$ outputs and provides a pulse whenever the "all zero" condition occurs. Since this occurs only once in the period of a code, and since the generator is clocked by a 25 MHz source, the frequency at the output of the AND gate is 25 MHz/or 12.2 KHz.

This frequency is fed to the counter and is divided by eight (three stages of flip-flops) to derive the 1.5 KHz signal. The 1.5 KHz signal is further divided by 32 (five stages of flip-flops) to produce the 47 Hz signal.

The pulse at the output of the AND gate is also fed into the maximal shift register to start the generation of the code again.

The output of synchronous switch 32 is also fed to the chain consisting of amplifier 37, filter 38, synchronous switch 39, performance monitor switch 40, and low pass filter 59. This chain comprises the performance monitor. Delay compensation network 41, which has the same function as delay compensation network 35 relative to synchronous switch 32, feeds synchronous switch 39. A fail signal from the performance monitor switch 40 is fed to gate 42 and to linear output converter 43. This output is also fed to sync gate 44 for control purposes as will be explained below.

During acquisition, the tracking code generator is clocked by the clock oscillator 4 through blanking gate 45 and acquisition gate 46. A control signal for the blanking gate 45 during acquisition is derived from counter number 1, while the acquisition control signal is derived from the sync gate 44.

A pulse position to pulse length converter 47, which may comprise a flip-flop, is fed at one terminal from the modulation code generator, and at the other terminal, from the tracking code generator. The output of the converter 47 is fed to the linear output converter 43, which may comprise an integrator, from which is derived a DC analogue signal on line 48. ARINC output converter 49, altitude trip number 1, 50 and altitude trip number 2,51, are optional features which may be provided in accordance with the invention.

The AGC system comprises an AGC voltage comparator 52, fed from the envelope detector 30 which also feeds AGC circuit 53. The output of the comparator and circuit are fed to two different inputs to AGC override 54. The output of the AGC voltage comparator is also fed to the sync gate 44 and ramp generator 55, which in turn provides output to AGC override 54, and counter number 2,56. A feedback connection is provided between counter number two and ramp generator 55.

In operation, the system works as follows: An RF CW wave, generated by the solid state source 1' is phase modulated in the phase modulator 2 by reversing the phase of the CW by 180° at predetermined intervals controlled by the modulation code generator 3 which is clocked by the clock oscillator (in the preferred embodiment, at a rate of 25 MHz). The modulated wave is applied to transmitter antenna 3 and launched in a manner well known. Any portion of the transmitted wave which is intercepted by a target will be reflected and received by receiver antenna 62. The received wave is applied to one input of mixer 5' which has the output of SSB generator 65 applied to the second input terminal thereof. The output of the mixer is a phase modulated signal at a frequency equal to the offset frequency of the SSB generator. In the preferred embodiment, the output of the mixer is a phase modulated 30 MHz signal. The spectrum at the output of the mixer is of the sin x/x form and contains no 30 MHz component (because of the phase modulation).

Notch filter 8'b suppresses any 30 MHz component coming from the SSB, so that the output of the notch filter is a sin $x/x$ spectrum centered on 30 MHz, but containing no 30 MHz component. As is apparent from the foregoing discussion, the preamplifier 8'a must be wideband, and in the preferred embodiment, the preamplifier is a low noise amplifier having a gain of 36 db and a bandwidth ranging from 50 KHz to 80 MHz.

Figure 3:
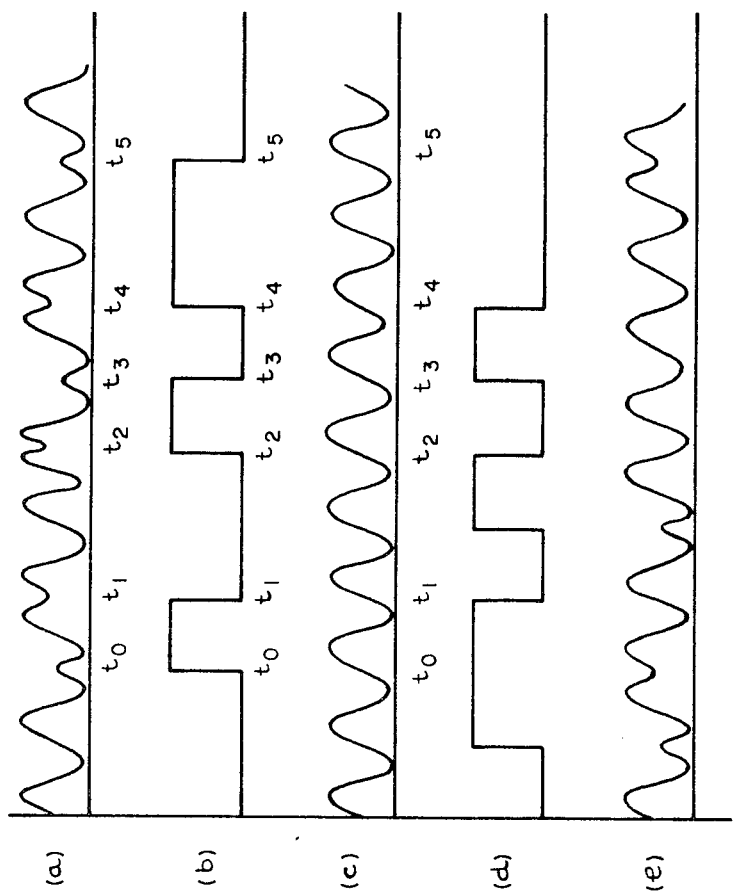
FIGS. 3 and 4 are graphs useful in explaining the operation of the FIG. 2 embodiment.

The output of the notch filter is applied to the phase demodulator which performs the same physical function as does the phase modulator, i.e., it reverses the phase of the input waveform by 180° at predetermined intervals. The output of the demodulator will be a wave high in IF content when the system is tracking and low in IF content when the system is off track. This is seen by an examination of FIG. 3 where waveform $b$ is a modulating waveform and waveform $a$ is a CW wave modulated by the waveform of waveform $b$. As can be seen in waveform $a$, there is a 180° phase reversal at times $t_0$, $t_1$, $t_2$, $t_3$, $t_4$ and $t_5$, i.e. at the times corresponding to the beginning or ending of a pulse in waveform $b$. If the waveform $a$ is demodulated by a waveform identical to that of waveform $b$, then the result will be a waveform as illustrated in waveform $c$, i.e., a waveform having only a CW frequency content. Thus, at $t_o$, the incoming wave would have a phase shift of 180°. However, the modulating waveform would shift the phase by a further 180°, so that the product of the demodulation would be a waveform of 360° or 0° phase shift. This process is, of course, repeated at times $t_1$ to $t_5$.

If, however, the demodulating waveform does not correspond to the waveform at waveform b, (the system is not on track) the product will be quite different. If, for example, the demodulating waveform were as illustrated in waveform d, then the product of demodulation would have the form illustrated in waveform e. As can be seen, the CW frequency content of this wave is far less than the CW frequency content of the wave in waveform c.

Figure 4:
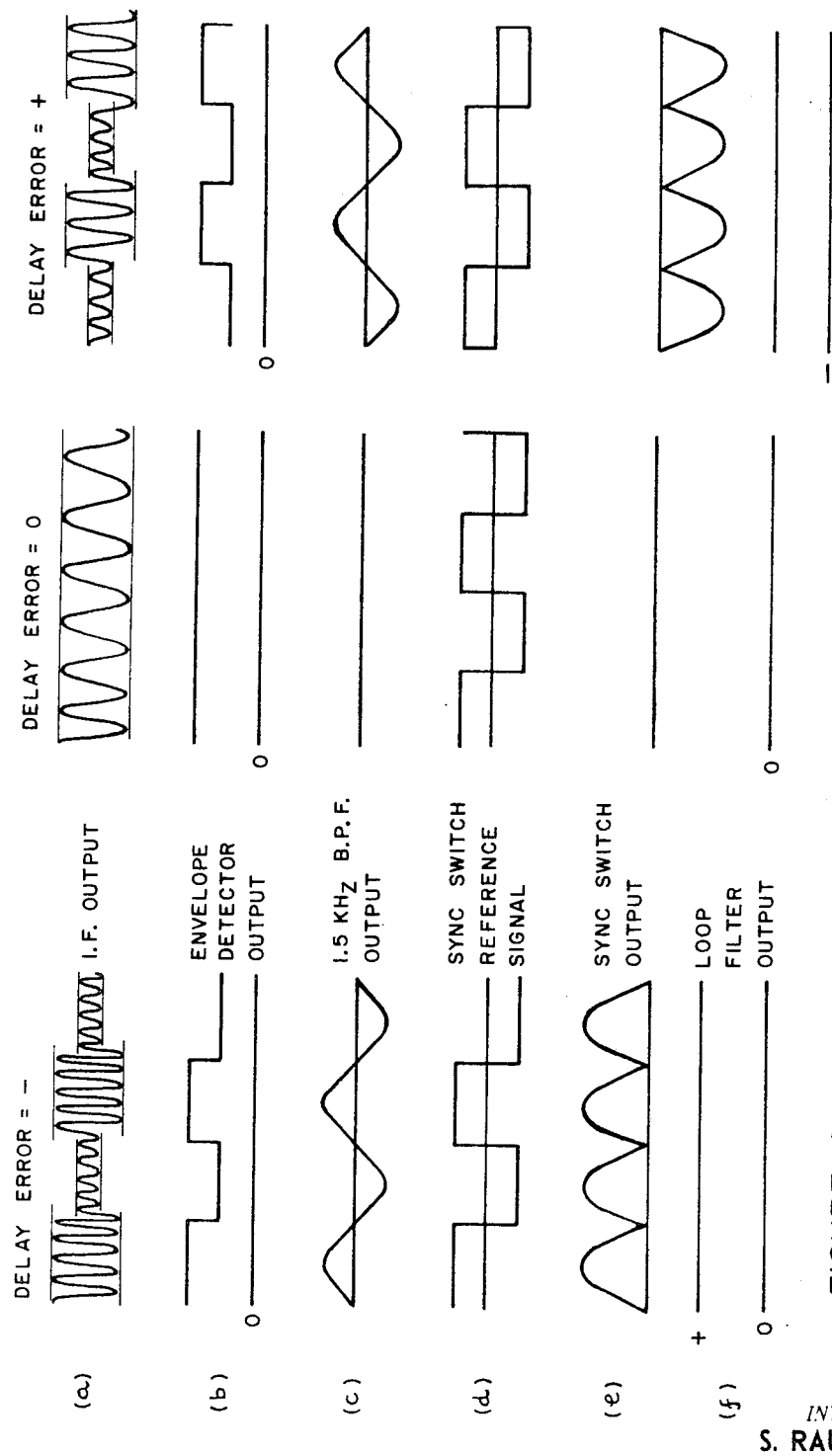

The demodulating signal is supplied from an nth and (n+1)th taps of the shift register comprising the tracking code generator. In a delay lock discriminator, two parallel channels are formed and the outputs of the two channels are subtracted to provide the driving signal for a voltage controlled oscillator. In the preferred embodiment shown in FIG. 2 hereof, a time sharing principle is used, and the nth and (n+1)th tap outputs are supplied to the phase demodulator 23 on a time shared basis. The outputs at various points in the system under conditions of +ve or −ve delay error, or delay error equal to zero (on track) are illustrated in FIG. 4. In the waveform a of FIG. 4, the 30 MHz signal is modulated at the switching (time sharing) rate when there is a delay error. The sense of delay error (+ve or −ve) is indicated by the position of the low content 30 MHz portion relative to the high content portion thereof, while the extent of the error is indicated by the difference in amplitude between the two portions. When the system is on track, i.e., the estimated delay is equal to the actual delay, then both portions are of equal amplitude, and the switching rate does not explicitly appear at the output of the IF amplifier.

As shown in waveform a of FIG. 4, the envelope detector 30 removes the IF as shown in waveform l of FIG. 4, and the 1.5 KHz BPF 31 extracts the 1.5 KHz sine component of the square wave at the output of the envelope detector as shown in waveform c of FIG. 4. The sync switch reference signal, shown in waveform d of FIG. 4 is supplied to the synchronous switch 32 via the delay compensation network 35 as described above, and the output of the synchronous switch, waveform e of FIG. 4, is apppied to the loop filter 33, which is a low pass filter passing virtually only D.C., which provides at its output a +ve or −ve DC level, depending on the sense of the delay error as shown in waveform f of FIG. 4. This DC level provides the drive for the voltage controlled oscillator 18 which is arranged to have a frequency equal to the clock frequency when zero volts DC is supplied from the output of the loop filter. As will readily be appreciated, by speeding up or slowing down the frequency of the VCO relative to the clock frequency when there is a delay error, the output of the tracking code generator is brought into alignment with the code on the received signal. When the two codes are in alignment, i.e., the system is on track, then the frequency of the VCO will correspond to the clock frequency so that the two codes will remain in alignment until a further error (change in height) is introduced.

In order to acquire initially, the system sweeps from zero feet up as is explained below. Before acquisition, acquisition gate 46 is open only to the signal from the clock oscillator and is closed to the signal from the VCO so that, initially, the tracking code generator is driven by the clock oscillator. During the acquisition period, the blanking gate 45 will periodically, on a signal from counter number 1,36 prevent a pulse from the clock oscillator from reaching the tracking code generator. When this happens, the tracking code generator will be delayed by one bit relative to the modulation code generator, and this constitutes a first approximation to the reflection delay. The blanking gate will continue to blank pulses from the clock oscillator until the delay between the tracking code generator and the modulation code generator is equal to the reflection delay. At this point, the output of the loop filter will go to zero, and the performance monitor will then provide a signal to the sync gate 44 which will then close the acquisition gate to the clock oscillator and open it to the VCO. The system is now in a tracking condition.

As the output of the loop filter will go to zero both when the system is on track as well as when there is no input to the system at all, a performance monitor was devised which indicates whether or not the system is on track when the loop filter has a zero output.

The performance monitor consists of the amplifier 37, filter 38, synchronous switch 39, performance monitor switch 40 and low pass filter 59. In addition, a very low frequency signal (in the preferred embodiment 47 Hz) is provided, via line 58, to both the loop filter 33, and, to the synchronous switch 39 via delay compensation network 41. The delay compensation network 41 adjusts the relative delay of the 47 Hz reference signal to the switch 39. The filter 38 passes only frequencies up to 47 Hz while the filter 59 passes substantially only the DC content of the performance monitor switch 40.

The basis of the performance monitor circuit is that, since the receiver comprises a closed loop system when tracking, it automatically compensates for perturbing errors. The perturbing signal is the 47 Hz signal fed to the loop filter. The 47 Hz signal is then fed around the loop, and the response of the loop is observed by noting the output of the synchronous switch 32. This signal is amplified in amplifier 37 and compared to the perturbing signal in synchronous switch 39. When the loop is operating at the tracking point, the loop is closed and the output of the low pass filter 59 is high. When the loop is not at the tracking point, the loop is equivalent to being open so that a perturbing signal will not be felt all around the loop. Under these conditions, the output of the low pass filter 59 will be low.

The output of the low pass filter may be fed through gate 42 to a memory light which is turned on when the output of the filter is low to warn the pilot that the system is not tracking. A low signal is also fed to the linear output converter to freeze its output when the system ceases tracking. In addition, the output of the performance monitor is fed to sync gate 44 to close acquisition gate 46 to the clock oscillator when the system is at the tracking point, and to open acquisition gate 46 to the clock oscillator when the system is not at the tracking point.

In order to convert the information available in the system to useful information concerning altitude, notice is taken of the fact that when the system is tracking, the output of the tracking code generator is delayed relative to the output of the modulation code generator by an amount equivalent to the signal two way propagation delay. Thus, by providing a pulse at a predetermined point in both the modulation and tracking code generators, and by measuring the time between the pulses, an indication of altitude can be obtained.

A most convenient point for these purposes is the all ones state of the shift register, i.e., that point at which all of the flip-flops in the shift register are in the one state. For these purposes, outputs are provided from the modulation and tracking code generators to the set and re-set terminals of a flip-flop comprising the pulse position to pulse length converter 47, and a pulse is provided to a respective one of the terminals when either of the generators passes the all ones state. The output of the flip-flop is a pulse train whose duty cycle is proportional to the relative delay between pulses from the generators and hence is proportional to the altitude. As the average value of a pulse train is proportional to its duty cycle, by processing the pulse train in an integrator comprising the linear output converter 43, a DC analogue of the altitude is obtained. It is noted that this method of measurement is particularly advantageous as the measurement is done separately from tracker operation and should, therefore, be relatively noise free.

The altitude trip number 1,50 and the altitude trip number 2,51, are voltage comparators which provide trip points at various critical altitudes as required by any particular application. In addition, the ARINC output converter 49 will convert the DC analogue to ARINC DC analogue standards, and means, not shown, may be provided to convert the DC signal to a digital equivalent.

It is standard practice to provide an RF delay line in altimeters to permit self-test without any external equipment. However, in accordance with the invention, a considerably simpler method is used. The delay line is replaced by a direct connection and a relative delay between the transmit and receive codes is simulated digitally using available signals from the modulation code generator.

A self-test signal appearing on line 30 from an external control (not shown) disconnects the receive antenna by opening switch 63, and connects a sample of the transmit signal directly to the receiver by closing test loop switch 27. The self-test signal also actuates self-test gate 61, whereby the relative delay between transmit and receive codes is digitally simulated. Any amount of relative delay may be simulated, however, in the preferred embodiment, a relative delay of 200 feet is used.

A further advantage of the inventive system is the ease with which dual simultaneous operation may be obtained. This is achieved simply and reliably, without interconnections by operating each of two systems with different code generator frequencies. The receiver/transmitter in both systems are identical, and each altimeter will transmit according to its own particular clock frequency and track only the waveform received from its own transmission even in the presence of a return from the other unit.

Although in the preferred embodiment one time-shared channel is used, it will be immediately obvious to one skilled in the art that two physical parallel channels could be used while incorporating all of the features of the preferred embodiment. In the two physical channel arrangement, the phase demodulator means would consist of two separate parallel phase demodulators and the nth output of the tracking code generator would be fed to one demodulator while the (n+1)th output would be fed to the second demodulator. The envelope detector, bandpass filter and synchronous switch would be replaced by a subtractor means fed with the outputs of the demodulators, and the time sharing gate would be eliminated.

Although a preferred embodiment has been described in the foregoing, it is to be understood that this was for the purpose of illustrating, but not limiting, the invention. Various modifications which will come readily to the mind of one skilled in the art are considered to be within the scope of the invention as defined in appended claims.

I claim:

1. A pseudo-randomly phase modulated radar altimeter comprising; a transmitter unit consisting of; a source of RF energy for providing a CW RF signal and comprising an output terminal; a phase modulator for phase modulating said RF signal and comprising an output terminal, RF input terminal means and modulation signal input terminal means; said RF input terminal means being fed from the output terminal of said RF source; said modulation signal input terminal means being fed from output terminal means of a modulation code generator; said modulation code generator providing a pseudo-random series of pulses and spaces; further comprising an input terminal fed from an output terminal of a clock oscillator providing clock pulses at a first frequency; said phase modulator being adapted to change the phase of said CW RF signal by 180° upon reception of the onset and completion of a pulse; and a receiver unit consisting of: an RF receiving portion having an input terminal and an output terminal; mixer means for converting the received RF signal to an IF signal and having two input terminals and an output terminal; one of said mixer input terminals being fed from the output of said RF receiving portion output terminal; the other of said mixer input terminals being fed from an output terminal of an offset generator; a tracking code generator having an input terminal and two output terminals; the signals at said tracking code modulator output terminals being identical with the exception that one output signal is time delayed relative to the other output signal; phase demodulator means comprising means for receiving said tracking code modulator outputs in two channel operation, an input terminal fed from the output terminal of said mixer, and output means for providing a two channel output, each channel providing a variable level output signal; subtraction means comprising input means adapted to receive said two channel output and to provide an output at an output terminal thereof dependant upon the difference in levels of said two channels; loop filter means having an input terminal and an output terminal; the input terminal of said loop filter means being fed with the output of said subtraction means; voltage controlled oscillator means having a control signal terminal and an output terminal; said voltage controlled oscillator control terminal being fed from the output of said loop filter; and means for connecting the output terminal of said voltage controlled oscillator means to the input terminal of said tracking code modulator under predetermined conditions; said tracking code generator, phase demodulator means, subtraction means, loop filter means and voltage controlled oscillator means, loop filter means and voltage controlled oscillator comprising a loop; the tracking code modulator and the modulation code generator being so constructed as to produce identical codes at the outputs thereof.

2. A pseudo-randomly phase modulated radar altimeter as defined in claim 1 wherein said modulation code generator and said tracking code generator comprise identical maximal length shift registers and wherein the delay between said tracking code generator outputs is equal to one bit.

3. A pseudo-randomly phase modulated radar altimeter as defined in claim 2 wherein said subtraction means comprises; an envelope detector having an input terminal and an output terminal; said envelope detector input terminal being fed with the output of said phase demodulator means; a bandpass filter having an input terminal fed from the output terminal of said envelope detector and an output terminal; a synchronous switch having an input terminal fed from the output terminal of said bandpass filter, a reference signal terminal, and an output terminal; said loop filter input terminal being fed from the output terminal of said synchronous switch; and further comprising a time sharing gate having two input terminals, an output terminal and a switching rate control terminal; said two input terminals being fed, respectively, from the two output terminals of said tracking code generator; said output terminal being fed to an input terminal of said phase demodulator; and means for providing a switching control signal for opening said time sharing gate alternately to signals on said two output terminals of said tracking code generator at a switching rate frequency, said switching control signal means having an output terminal fed in parallel to the switching rate control terminal of said time sharing gate and said reference signal terminal of said synchronous switch.

4. A pseudo-randomly phase modulated radar altimeter as defined in claim 3 wherein said switching control signal means comprises a frequency counter having an input terminal, fed from a third output terminal of said tracking code generator, and three output terminals.

5. A pseudo-randomly phase modulated radar altimeter as defined in claim 4 and further comprising a delay compensation network having an input terminal and an output terminal; the input terminal of said delay compensation network being fed from one output terminal of said frequency counter; the reference signal terminal of said synchronous switch being fed from said one output terminal of said delay compensation network.

6. A pseudo-randomly phase modulated radar altimeter as defined in claim 5 and further comprising; an acquisition gate having three input terminals and an output terminal; a blanking gate having two input terminals and an output terminal; performance monitor means having an output terminal; and means for detecting a tracking condition in the receiver portion having an input terminal and an output terminal; the output terminal of said clock oscillator being fed to one input terminal of said blanking gate; means for periodically blanking said blanking gate being fed to the other input terminal of said blanking gate; the output terminal of said blanking gate being fed to one input terminal of said acquisition gate; the output terminal of said performance monitor means being fed to a second terminal of said acquisition gate; the output terminal of said voltage controlled oscillator means being fed to the third input terminal of said acquisition gate; the output terminal of said acquisition gate being fed to the input terminal of said tracking code generator; whereby, to initiate acquisition, a clocking pulse is provided by said clock oscillator to both said modulation code generator and, through said blanking gate and said acquisition gate, to said tracking code generator; the periodic blanking of said blanking gate preventing a pulse from said clock oscillator from reaching said tracking code generator to thereby provide a relative delay between said modulating code generator and said tracking code generator; the blanking continuing periodically until said relative delay is equal to the travel time between said radar and a target, whereupon said means for detecting a tracking condition will detect a tracking condition; said means for detecting a tracking condition providing a pulse to said acquisition gate to open said gate to said voltage controlled oscillator means and to close it to said clock oscillator when a tracking condition is detected so that the clocking pulse to said tracking code generator will be supplied by said voltage controlled oscillator means; the output of said loop filter under tracking conditions being substantially zero volts DC; said voltage controlled oscillator means being such that, when zero volts DC is applied to its signal control terminal, the frequency of said voltage controlled oscillator means is substantially equal to the frequency of said clock oscillator.

7. A pseudo-randomly modulated radar altimeter as defined in claim 5 and further comprising; a transmitting antenna; output means connecting the output of said phase modulator to said transmitting antenna; a receiving antenna; input means connecting the receiving antenna to said input terminal of said mixer, said input means comprising a first switch having a control signal terminal; means coupling said input means to said output means, said coupling means comprising a second switch having a control signal terminal; a self-test gate having input terminal means, a control signal terminal and an output terminal; and self-test signal means having an output terminal; the output terminal of said self-test signal means being fed to the control signal terminals of said first switch, said second switch and said self-test gate; said switches being arranged such that, when said first switch is open said second switch is closed and vice-versa; said input terminal means of said self-test gate being fed from said output terminal means of said modulation code generator; said output terminal of said self-test gate being fed to said input terminal means of said phase modulator; the switches and self-test gate arrangement being such that, when a signal is applied from said self-test signal means, said first switch is opened and said second switch is closed whereby the transmitter is coupled directly to the receiver and the receiver is uncoupled from said receiver antenna, and said self-test gate generates a relative predetermined delay between a transmit and a receive code.

8. A pseudo-randomly phase modulated radar altimeter as defined in claim 5 wherein said loop filter comprises a further input terminal, and further comprising; means for generating a perturbing signal at a very low frequency and having an output terminal; a second delay compensation means having an input terminal and an output terminal; a second synchronous switch having an input terminal, a reference signal terminal and an output terminal; a first low pass filter having an input terminal and an output terminal; and a second low pass filter having an input terminal and an output terminal; the output terminal of said perturbing signal generating means being fed to said further input terminal of said loop filter and said input terminal of said second delay compensation network; the output terminal of said second delay compensation network being fed to the reference signal terminal of said second synchronous switch; the output terminal of said subtraction means being fed to the input terminal of said first low pass filter; the output terminal of said first low pass filter being fed to the input terminal of said second synchronous switch; the output terminal of said second synchronous switch being fed to the input terminal of said second low pass filter; said first low pass filter being adapted to pass frequencies at and below said very low frequency and said second low pass filter being adapted to pass substantially only the DC component at the output of said second synchronous switch; whereby a perturbing signal is introduced into the loop at the loop filter and the performance of the loop is monitored by examining the effect of the perturbing signal on the loop at the ouput of the subtraction means in the second synchronous switch.

9. A pseudo-randomly phase modulated radar altimeter as defined in claim 5 and further comprising; a flip-flop means having a first input terminal, a second input terminal and an output terminal; and an integrator means having an input terminal and an output terminal; said first input terminal of said flip-flop means being fed from a second output terminal of said modulation code generator and said second input terminal of said flip-flop being fed from a second output terminal of said tracking code generator; the output terminal of said flip-flop means being fed to the input terminal of said integrator; the output terminal of said integrator being fed to a display means; the tracking code generator and the modulation code generator being adapted to provide a signal to the respective flip-flop input terminals when each reaches a same predetermined position in the codes thereof; whereby, the output of the flip-flop will be a pulse train whose duty cycle is proportional to the relative delay between the tracking code generator and modulation code generator codes; and the output of said integrator is an analogue signal whose level is proportional to said delay.

10. A pseudo-randomly modulated radar altimeter as defined in claim 6 and further comprising; a transmitting antenna; output means connecting the output of said phase modulator to said transmitting antenna; a receiving antenna; input means connecting the receiving antenna to said one input terminal of said mixer, said input means comprising a first switch having a control signal terminal; means coupling said input means to said output means, said coupling means comprising a second switch having a control signal terminal; a self-test gate having input terminal means, a control signal terminal and an output terminal; and self-test signal means having an output terminal; the output terminal of said self-test signal means being fed to the control signal terminals of said first switch, said second switch and said self-test gate; said switches being arranged such that, when said first switch is open said second switch is closed and vice-versa; said input terminal means of said self-test gate being fed from said output terminal means of said moudlation code generator; said output terminal of said self-test gate being fed to said input terminal means of said phase modulator; the switches and self-test gate arrangement being such that, when a signal is applied from said self-test signal means, said first switch is opened and said second switch is closed whereby the transmitter is coupled directly to the receiver and the receiver is uncoupled from said receiver antenna, and said self-test gate generates a relative predetermined delay between the transmit and receive codes.

11. A pseudo-randomly phase modulated radar altimeter as defined in claim 10 wherein said loop filter comprises a further input terminal, and wherein said frequency counter is adapted to provide a perturbing signal at a very low frequency at its third output terminal; and further comprising; a second delay compensation means having an input terminal and an output terminal; a second synchronous switch having an input terminal, a reference signal terminal and an output terminal; a first low pass filter having an input terminal and an output terminal; and a second low pass filter having an input terminal and an output terminal; said perturbing signal being fed to said further input terminal of said loop filter and said input terminal of said second dealy compensation network; the output terminal of said second delay compensation network being fed to the reference signal terminal of said second synchronous switch; the output terminal of said first synchronous switch being fed to the input terminal of said first low pass filter; the output terminal of said first low pass filter being fed to the input terminal of said second synchronous switch; the output terminal of said second synchronour switch being fed to the input terminal of said second low pass filter; said first low pass filter being adapted to pass frequencies at and below said very low frequency and said second low pass filter being adapted to pass substantially only the DC component at the output of said second synchronous switch; whereby a perturbing signal is introduced into the loop at the loop filter and the performance of the loop is monitored by examining the effect of the perturbing signal on the loop at the output of the first synchronous switch in the second synchronous switch; said first low pass filter, second synchronous switch, second low pass filter and second delay compensation network comprising said means for detecting a tracking condition.

12 A pseudo-randomly phase modulated radar altimeter as defined in claim 11 and further comprising; a flip-flop means having a first input terminal, a second input terminal and an output terminal; and an integrator means having an input terminal and an output terminal; said first input terminal of said flip-flop means being fed from a second output terminal of said modulation code generator and said second input terminal of said said flip-flop being fed from a second output terminal of said tracking code generator; the output terminal of said flip-flop means being fed to the input terminal of said integrator; the output terminal of said integrator being fed to a display means; the tracking code generator and the modulation code generator being adapted to provide a signal to the respective flip-flop input terminals when each reaches a same predetermined position in the codes thereof; whereby, the output of the flip-flop will be a pulse train whose duty cycle is proportional to the relative delay between the tracking code generator and modulation code generator codes; and the output of said integrator is an analogue signal whose level is proportional to said delay.

13. A pseudo-randomly phase modulated radar altimeter as defined in claim 12 comprising two identical altimeter systems each being adapted to be operated at a different clock oscillator frequency.

* * * * *